Oct. 20, 1970    D. P. HERBERT    3,534,490
SECTION FRAME
Filed July 9, 1968    2 Sheets-Sheet 1
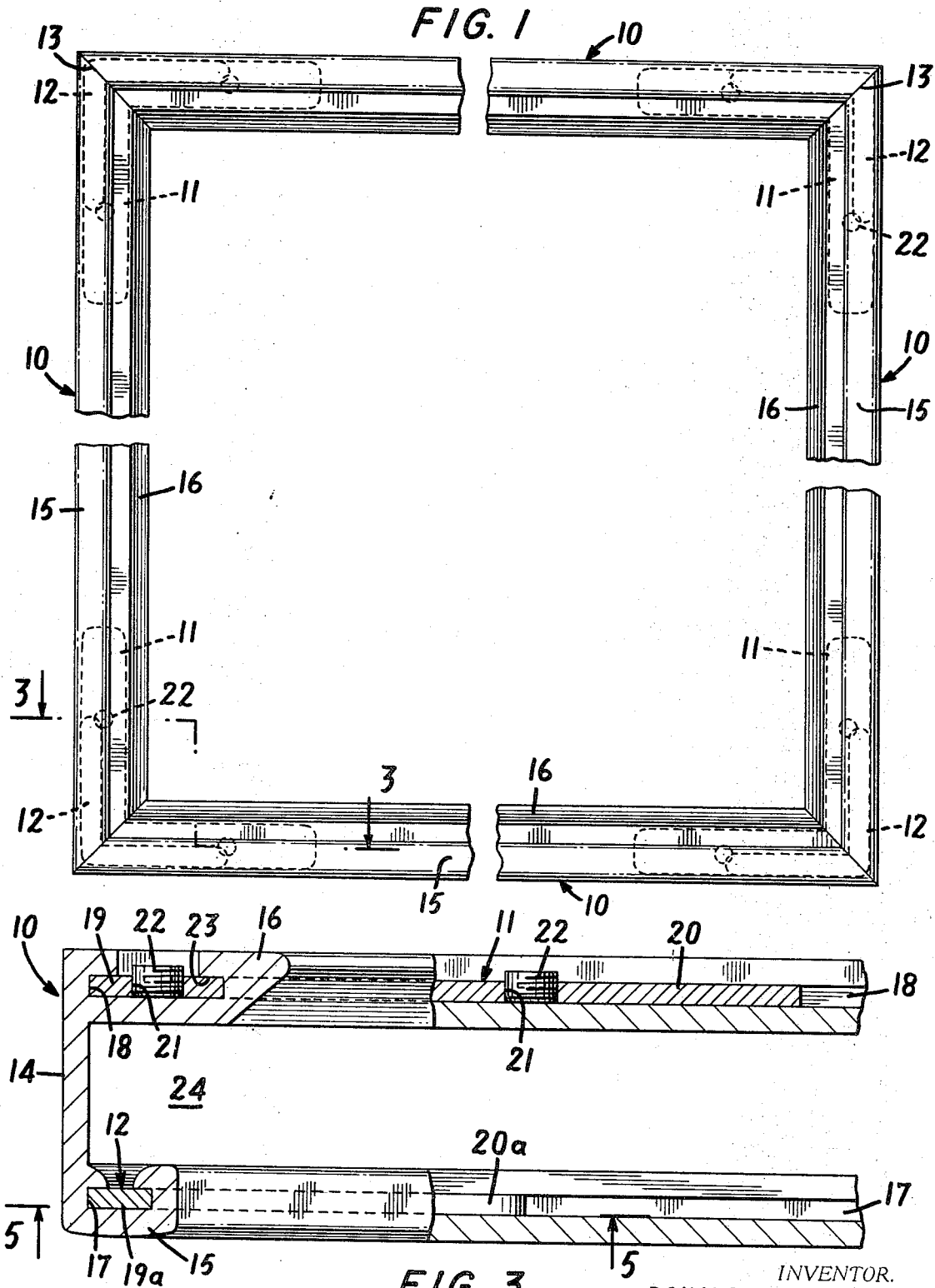
INVENTOR.
DONALD P. HERBERT
BY
his ATTORNEYS

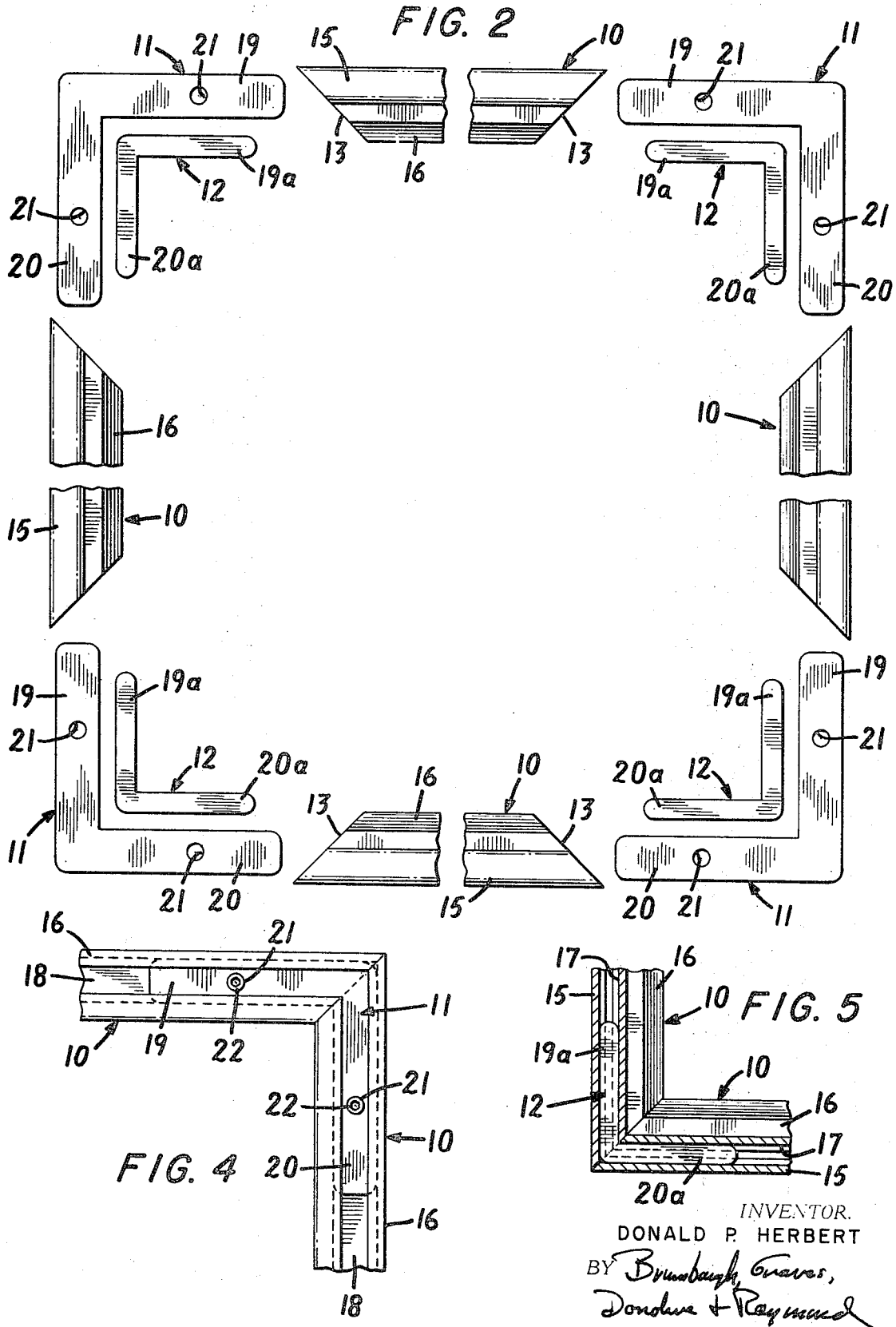

United States Patent Office 3,534,490
Patented Oct. 20, 1970

3,534,490
SECTION FRAME
Donald P. Herbert, Womelsdorf, Pa. 19567
Filed July 9, 1968, Ser. No. 743,439
Int. Cl. G09f 1/12
U.S. Cl. 40—155
2 Claims

ABSTRACT OF THE DISCLOSURE

A frame for mounting and displaying pictures or other flat objects comprising multiple side members joined end to end. Each side member has one or more channels or slots adapted to coincide with and communicate with similar channels or slots in other side members. Locking joints are used at the joinder point between each two side members with portions of one or more locking joints extending into one or more slots or channels of each adjoining side members. Means are provided for fixing the locking joints into said slots or channels thereby rigidly joining contiguous side members and providing a rigid and strong frame capable of easy assembly and disassembly.

BACKGROUND OF THE INVENTION

This invention relates to a frame that will provide not only a pleasing appearance when assembled but can be easily assembled or disassembled by anyone without the need of tools. Anyone wishing to frame a picture, diploma or similar article is presently met with the problem of obtaining a proper size frame and mounting the object to be framed within it. In most instances this requires the assistance of a skilled commercial framer who will be able to cut the frame to proper size from molding elements available to him, assemble it with nails and/or glue and then mount the object to be framed within it. An additional step of wedging the article within the frame evenly is frequently necessary. As is obvious many people are not able to construct such frames because of lack of knowledge as to how to build a frame, no access to the necessary materials or inability to obtain or use the required tools. For those unskilled in such work the frame when assembled by them lacks attractiveness, is weak and frequently separates at the joints.

It is apparent from the foregoing that it would be most desirable to provide a frame that is not only esthetically pleasing but easy to assemble by anyone. Adding to this the quality of rigidity and strength, freedom from separation, and the ability to be assembled and disassembled easily and quickly without the need for tools and there is offered a most useful invention.

SUMMARY OF INVENTION

In accordance with the present invention a readily assembled and disassembled frame is provided with great strength and rigidity by the use of a plurality of side members in combination with simple locking and supporting means at the corners of the frame.

In the frame of the present invention each side member is provided with a slot or channel at each end. A locking joint with portions angled at right angles is slipped into the slots of adjoining side members, thus bringing the side members together in the proper relationship. Because the ends of each side member are usually beveled, their joinder forms a mitered joint. Once the locking joints place the side members in proper relationship, means associated with the locking joints are used to wedge or otherwise firmly lock the joints into the slots. At this point the side members are not only correctly aligned but firmly fastened to each other. When all four sides of the frame are thus locked together the resulting frame is not only rigid and strong but is attractive.

DRAWINGS

FIG. 1 is a front plan view of the completely assembled frame of this invention.

FIG. 2 is an exploded view of the frame.

FIG. 3 is a partial sectional view taken along the line 3—3 of FIG. 2.

FIG. 4 is a partial plan view of the reverse side of the frame.

FIG. 5 is a fragmentary sectional view taken along line 5—5 of FIG. 3.

DESCRIPTION OF THE INVENTION

A preferred embodiment of the frame of this invention is shown in the drawings and is described in detail below. The frame of the preferred embodiment is made of aluminum but it will be obvious that it can be made of other materials including metals, plastics, wood or plaster. The particular type of material used will depend on its ease and cost of fashioning into the parts required and its overall attractiveness in the finished frame.

As will be seen from FIG. 2, the frame is made from a combination of two basic elements, the side members 10 and the locking joints 11 and 12 which are used to fasten the side members together.

To make the frame only four side members need be used while four or eight locking joints will be required depending on the degree of strength and rigidity desired. While all frames will be of greater strength if two locking joints are used at each corner this number is particularly desired where larger frames are constructed.

It will be noted that the side members 10 are beveled at their ends 13 so as to form an attractive miter joint when joined together as shown in FIG. 1.

Reference to FIGS. 3, 4 and 5 will show how the locking members 11 and 12 are inserted into the side members 10 and wedged therein.

In more detail, it will be seen in FIG. 3 that side member 10, in the preferred embodiment, can be an extrusion or a molded length having a base portion 14 and extending from the base portion two projections 15 and 16. These two projections may be of equal width depending on the ultimate appearance of the frame desired. Said projections can be spaced apart from each other any distance depending on the size and type of object to be framed. In FIG. 3 the projection 15 is of lesser width than projection 16 in order to provide a narrow edge around the object to be framed. As will be noted from FIG. 1 the only portions of the side member 10 seen after the frame is completed and mounted on the wall are base portion 13 and projection 15. Thus, projection 15 can be varied in width, fluting or other design to obtain the effect desired in the final form of the frame.

In projection 15 there is found a slot 17 and in projection 16 there is a slot 18. These slots can be made in various ways such as by extrusion, by molding, by routing or other methods. As will be noted from FIGS. 4 and 5, it is necessary only that these slots extend along projections 15 and 16 for sufficient length to accommodate the locking joints 11 and 12 and in particular angled portions 19 and 20 or 19a and 20a of the locking joints. In the preferred embodiment which is made of aluminum and in which the side members 10 are formed by extrusion, the slots 17 and 18 which are formed during the extruding, extend the entire length of the side member. Extending slots the entire length of the side members not only facilitate extrusion but enables long lengths of the extrusion to be made. When the long extrusion is later cut into the desired lengths the slots 17 and 18 will be readily available at each end of the length cut.

The shape of slots 17 and 18 will depend on the shape and size of the locking joint to be used and also the width, thickness and shape of the projection in which it is found.

In the preferred embodiment the locking joints 11 and 12 as seen in FIGS. 4 and 5 are in the form of thin angle brackets with their angled portions 19 and 20 and 19a and 20a at right angles to each other in the same plane. In addition, because of the desire to make projection 15 as thin as possible locking joint 12 is of a smaller size relative to locking joint 11. As will readily be seen locking joints 11 and 12 are designed to slip into the corresponding slots in projections 15 and 16. The slots 17 and 18 are slightly larger than the locking joints 12 and 11 to accommodate the joints.

If desired the slots 17 and 18 and the locking joints 11 and 12 could be of rectangular, circular or other shape. The choice of shape of locking joint and slot to accommodate it will depend on many factors including ultimate frame design desired, ease of manufacture and economy of production.

Returning to the preferred embodiment, it is again noted that the locking joints 11 and 12 are thin angle brackets. As will be noted from FIGS. 3, 4 and 5, the locking joints 11 have holes 21 in their angle portions 19 and 20 in which set screws 22 are positioned. In the preferred embodiment holes 21 and set screws 22 are provided only in locking joint 11 since this has been found sufficient for rigidity and this locking joint is most accessible in assembling the frame. Such holes and screws may, if desired, be also provided in locking joint 12. When, for example, the angle portion 19 of locking joint 11 is inserted in slot 18 the set screw 22 may be tightened in hole 21, so that the angle portion 19 is forced against walls 23 of the slot locking the angle portion firmly within the slot. When the remaining angle portion 20 of locking joint 11 is inserted in corresponding slot 18 of an adjoining side member 10 and similarly locked therein, the two side members are rigidly fastened together.

While set screws are shown as locking means any means to releasably lock the angle portions within their corresponding slots can be used such as shims or wedges.

While only one slot and one locking joint may be used for each joinder of side members, the joinder is not as rigid as when two slots and two locking joints are used. Thus, in the preferred embodiment both slots 17 and 18 and both locking joints 12 and 11 are provided.

In assembling the frame the locking joints 11 and 12 are inserted in the slots 18 and 17 of a first side member. A second side member is fastened onto the exposed angle portions of locking joints 11 and 12 and the set screws 22 in locking joints 11 are then driven down tight by a simple small wrench. Additional locking joints are inserted in the corresponding slots on the opposite end of said second member and a third side member is attached to and locked to second side member as was done between the first and second side members. The object to be framed is then slid into the space 24 between projections 15 and 16 on each side member. A final side member with locking members inserted in the slots 17 and 18 in each end is then affixed to complete the frame and the set screws locked as previously described in assembling together the other side members. A firm frame has now been formed simply, attractively and it is capable of easy disassembly by loosening of the set screws.

Because of the shape of the projections 16 it will be observed that the assembled frame can be hung on nails, screws or other projections from walls.

In view of the above description it will be seen that the present invention provides a simple assembled frame of light weight which will have great strength and rigidity. In addition the frame can be assembled and disassembled as often as wished. Further advantages are obvious including the ability to prepackage frames of set dimensions or to prepackage in separate packages side members of various lengths with a requisite number of locking joints which will enable the purchaser to design and construct frames of varying dimensions by purchasing packages of varying lengths.

Although the invention has been described with reference to specific materials and embodiments, it will be appreciated that certain variations and modifications will be apparent to those skilled in the art. Accordingly, all such modifications and variations are intended within the scope of the appended claims.

I claim:

1. A picture frame comprising a plurality of unitary members having identically shaped cross-sections and joined end-to-end to enclose a predetermined area, each of said members having in cross-section a base portion, a front end portion and a rear end portion, said end portions being flanges extending inwardly from said base portion and being spaced from each other to define a slot to receive a material to be displayed in said area, a means defining a channel in the rear end portion extending the entire length thereof and communicating with corresponding channels in contiguous members of the frame, the edge the rear flange remote from the base being shaped to define an undercut part remote from the rear face thereof, thereby to define a projecting portion adjacent said rear face adapted to capture a mounting element and to facilitate hanging the picture frame, a locking joint at the point of engagement between each two members, said locking joint having two angled portions, one angled portion extending into the channel in the rear end portion of one member and another angled portion extending into the communicating channel of the adjacent member, and a hole in each angled portion of said locking joint with a set screw provided therein which, when tightened, forces said angled portion against the walls of said channel.

2. A picture frame as defined in claim 1 wherein the front flange of each member has a channel adapted to receive a second locking joint at the point of engagement between each two members, said locking joint having two angled portions, one angled portion extending into the channel of the front end portion of one member and the second portion extending into the communicating channel of the adjacent member.

References Cited

UNITED STATES PATENTS

| | | | |
|---|---|---|---|
| 2,717,667 | 9/1955 | Bancroft. | |
| 2,654,451 | 10/1953 | Schmidgall | 40—152 |
| 2,816,632 | 12/1957 | Nardulli. | |
| 3,018,861 | 1/1962 | Somville. | |
| 3,095,661 | 7/1963 | Ellis | 40—156 |

EUGENE R. CAPOZIO, Primary Examiner

W. J. CONTRERAS, Assistant Examiner